US008349981B2

(12) United States Patent
Fechner et al.

(10) Patent No.: US 8,349,981 B2
(45) Date of Patent: *Jan. 8, 2013

(54) ANIONIC ADDITIVES SOLUBLE IN WATER AND IN SOLVENTS

(75) Inventors: Bjoern Fechner, Wasbek (DE); Carsten Schaefer, Muehldorf (DE); Alexander Woerndle, Frankfurt am Main (DE)

(73) Assignee: Clariant Finance (BVI) Limited, Torola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 13/059,153

(22) PCT Filed: Jul. 17, 2009

(86) PCT No.: PCT/EP2009/005199
§ 371 (c)(1),
(2), (4) Date: Feb. 15, 2011

(87) PCT Pub. No.: WO2010/020315
PCT Pub. Date: Feb. 25, 2010

(65) Prior Publication Data
US 2011/0144280 A1 Jun. 16, 2011

(30) Foreign Application Priority Data
Aug. 16, 2008 (DE) .................. 10 2008 038 071

(51) Int. Cl.
*C08F 118/02* (2006.01)
*C08F 30/04* (2006.01)
*C08F 12/30* (2006.01)
*C08F 220/68* (2006.01)
*C08F 228/06* (2006.01)
*C08F 226/06* (2006.01)

(52) U.S. Cl. ........ 526/319; 526/240; 526/287; 526/312; 526/320; 525/326.7; 525/328.8; 525/327.2; 525/55

(58) Field of Classification Search .................. 526/319, 526/240, 277, 287, 312, 320; 525/326.7, 525/328.8, 327.2, 55
See application file for complete search history.

(56) References Cited

U.S. PATENT DOCUMENTS

| 5,472,617 | A | * | 12/1995 | Barthold et al. | .............. 210/708 |
| 5,798,425 | A | * | 8/1998 | Albrecht et al. | .............. 526/271 |
| 6,211,317 | B1 | * | 4/2001 | Albrecht et al. | .............. 526/271 |
| 7,905,955 | B2 | | 3/2011 | Fechner et al. | |
| 7,938,900 | B2 | | 5/2011 | Fechner et al. | |
| 8,202,361 | B2 | | 6/2012 | Fechner et al. | |
| 2002/0019459 | A1 | * | 2/2002 | Albrecht et al. | .............. 523/161 |
| 2002/0137865 | A1 | | 9/2002 | Haubennestel et al. | |
| 2003/0144378 | A1 | * | 7/2003 | Mizushima et al. | .......... 523/160 |
| 2003/0209695 | A1 | * | 11/2003 | Tsuzuki et al. | ............ 252/363.5 |
| 2008/0293874 | A1 | | 11/2008 | Schrod et al. | |
| 2010/0137536 | A1 | | 6/2010 | Fechner et al. | |
| 2011/0065879 | A1 | | 3/2011 | Fechner et al. | |
| 2011/0144245 | A1 | | 6/2011 | Fechner et al. | |
| 2011/0160404 | A1 | | 6/2011 | Fechner et al. | |
| 2011/0184097 | A1 | | 7/2011 | Fechner et al. | |
| 2011/0185781 | A1 | | 8/2011 | Fechner et al. | |
| 2011/0213094 | A1 | | 9/2011 | Fechner et al. | |
| 2011/0244385 | A1 | | 10/2011 | Fechner et al. | |

FOREIGN PATENT DOCUMENTS

| DE | 102005019384 | 11/2006 |
| EP | 0264841 | 4/1986 |
| EP | 1081169 | 3/2001 |
| EP | 1293523 | 3/2003 |
| EP | 1323789 | 7/2003 |
| EP | 1562696 | 6/2004 |
| WO | WO2006/038727 | 4/2006 |

OTHER PUBLICATIONS

PCT International Search Report for PCT/EP2009/005199, mailed Nov. 10, 2009.
English Translation of the International Preliminary Report on Patentability for PCT/EP2009/005199, mailed Mar. 3, 2011.

* cited by examiner

*Primary Examiner* — Michael M Bernshteyn
(74) *Attorney, Agent, or Firm* — Anthony A. Bisulca

(57) ABSTRACT

The invention relates to anionically modified copolymers that can be obtained by the polymerization of monomers (A), (B), (C) and (D) in order to obtain non-ionic copolymers comprising reactive terminal OH groups, and subsequent reaction of the terminal OH groups to form anionic end groups, where A) is a monomer of formula (I) wherein A is C2-C4 alkylene and B is a C2-C4 alkylene different from A, and R is hydrogen or methyl; (B) is a monomer of formula (II) wherein D is C3 alkylene, R is hydrogen or methyl, and o is a number between 2 and 500; (C) is an ethylenically unsaturated monomer containing an aromatic group; and (D) is an ethylenically unsaturated monomer containing an alkyl radical.

10 Claims, No Drawings

ANIONIC ADDITIVES SOLUBLE IN WATER AND IN SOLVENTS

The present invention relates to novel anionic copolymers, which are used as dispersants for water- and solventborne pigment formulations, and to a process for producing these copolymers.

Dispersing pigments in liquid media typically requires dispersants. Dispersants, augmented by suitable surfactants, also known as wetters, act as surface-active agents in promoting the wetting of the pigments to be dispersed, and facilitate the deconstruction of agglomerates and aggregates when producing pigment dispersions, which is generally accomplished with the aid of a grinding operation. Dispersants can be of anionic, cationic, amphoteric or neutral structure. They can be of low molecular weight, or represent high molecular weight polymers which constitute a random, alternating, blocklike, comblike or star-shaped architecture of the polymerized monomers. Examples of where dispersants are of particular commercial importance are the dispersing of pigments in the manufacture of pigment concentrates (used for coloration of emulsion and varnish colors, paints, coatings and printing inks) and also the coloration of paper, cardboard and textiles. Lately, interest has focused on the search for dispersants and additives which, following a drying operation performed on the liquid dispersion, ensure rapid dissolving of the dry powder or granulate in the application medium. Comb polymers can be useful here.

Comb polymers are usually prepared using macromonomers based on mono(meth)acrylic esters as comonomers, and they differ from other polymeric dispersants in that they have a clearly ordered structure wherein hydrophobicity and hydrophilicity, or polarity, can be apportioned between the main chains and the side chains.

EP 1 293 523 describes a dispersant which is a polymer which has a weight average molecular weight of about 5000 to 100 000 and comprises 20% to 80% by weight of a hydrophilic backbone and 80% to 20% by weight of macromonomeric side chains. The backbone consists of 70% to 98% by weight, based on the weight of the backbone, of polymerized ethylenically unsaturated monomers free of any carboxyl groups, and also 2% to 30% by weight of polymerized ethylenically unsaturated monomers bearing a carboxyl group, wherein at least 10% of the carboxyl groups are neutralized with an amine or an inorganic base. The backbone is hydrophilic in comparison to the side chains. The side chains consist of macromonomers of polymerized ethylenically unsaturated monomers.

EP 1 081 169 describes branched polymers derived from the following mixture of monomers:
(A) 50% to 93% by weight of at least one ethylenically unsaturated monomer,
(B) 2% to 25% by weight of at least one ethylenically unsaturated macromonomer having a molecular weight of 1000 to 20 000, and
(C) 5% to 25% by weight of at least one polymerizable imidazole derivative.

EP 1 562 696 describes polymeric dispersants synthesized, in aqueous emulsion polymerization, using macromonomers consisting of polyalkylene glycol mono(meth)acrylates. The main chain of the polymer must contain ethylenically unsaturated monomers having at least one amino group.

DE 10 2005 019 384 describes comb polymers which are synthesized from ethylenically unsaturated monomers such as alkyl(meth)acrylates and aryl(meth)acrylates in combination with a pure polyethylene glycol mono(meth)acrylate, and are used as dispersants.

EP 1 323 789 describes comb-type polymers which contain polyalkylene oxide mono(meth)acrylate units, yet are not water soluble. An object is to provide aqueous inks. EP 1 491 598 is similar in that it contains polyalkylene oxide mono(meth)acrylate units and salt-forming monomers; the polymers are used for aqueous inks.

The patents cited describe the state of the art of providing comb-shaped or block-forming polymers as dispersants. However, the dried powders or granulates are easily dispersed in an aqueous system only or in a solvent-containing system only.

No invention described to date provides dispersants capable of effectively stabilizing aqueous pigment dispersions which are subsequently readily dryable, for example by spray drying, to produce a powder or granulate capable of easy dispersion in aqueous and solvent-containing systems alike, with rapid and high development of color strength. The decisive advantage here is the universal dispersibility of the powder or granulate in both aqueous and solvent-containing systems.

It has now been found that, surprisingly, specific anionic comb copolymers, prepared by means of macromonomers composed of polyethylene/polypropylene glycol mono(meth)acrylic esters, achieve the object described, viz., universal dispersibility.

The present invention accordingly provides anionically modified copolymers obtainable by polymerization of monomers (A), (B), (C) and (D) to obtain nonionic copolymers having reactive terminal OH groups, and subsequent conversion of the terminal OH groups to anionic end groups, for example to sulfuric monoesters, where
(A) is a monomer of formula (I)

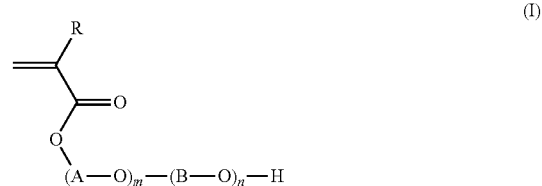

where
A represents $C_2$-$C_4$-alkylene,
B represents a $C_2$-$C_4$-alkylene other than A,
R represents hydrogen or methyl,
m is from 1 to 500, preferably 1 to 50;
n is from 1 to 500, preferably 1 to 50,
and the sum total of m+n is from 2 to 1000;
(B) is a monomer of formula (II)

where
D represents $C_3$-alkylene,
R represents hydrogen or methyl,
o is from 2 to 500, preferably 2 to 100, particularly 2 to 50, particularly preferably 5 to 25;

(C) is an ethylenically unsaturated monomer which contains an aromatic group; and (D) is an ethylenically unsaturated monomer which contains an alkyl radical.

The copolymer of the present invention has customary terminal groups which are formed by the initiation of the free-radical polymerization or by chain transfer reactions or by chain termination reactions, for example a proton, a group derived from a free-radical initiator or a sulfur-containing group derived from a chain transfer reagent.

The anionic end groups can be sulfates, carboxylates or phosphates.

The molar fraction of the monomers is preferably 0.1 to 90% for monomer (A), 0.1 to 90% for monomer (B), 0.1 to 90% for monomer (C) and 0.1 to 90% for monomer (D), the molar fractions summing to 100%.

It is particularly preferable for the molar fraction of the monomers to be 0.1 to 70% for monomer (A), 10 to 80% for monomer (B), 0.1 to 50% for monomer (C) and 0.1 to 50% for monomer (D).

The alkylene oxide units $(A-O)_m$ and $(B—O)_n$ of monomer (A) can be present either in a random arrangement or, as in the case of a preferred embodiment, in a blocklike arrangement.

In one preferred embodiment, $(A-O)_m$ represents propylene oxide units and $(B—O)_n$ represents ethylene oxide units, or $(A-O)_m$ represents ethylene oxide units and $(B—O)_n$ represents propylene oxide units, and the molar fraction of ethylene oxide units is preferably 50 to 98%, more preferably 60 to 95% and even more preferably 70 to 95%, based on the sum total (100%) of ethylene oxide and propylene oxide units.

The sum total of the alkylene oxide units can in principle be n+m=2 to 1000, although 2 to 500 is preferred, 2 to 100 is particularly preferred and 5 to 50 is even more particularly preferred.

Preferred monomers (C) can be described by the formula (IIIa) or (IIIb):

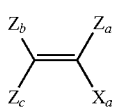

(IIIa)

where
$X_a$ represents an aromatic or araliphatic radical having 3 to 30 carbon atoms which optionally contains one or more, e.g., 1, 2 or 3, of the heteroatoms N, O and S,
$Z_a$ represents H or $(C_1-C_4)$-alkyl,
$Z_b$ represents H or $(C_1-C_4)$-alkyl, and
$Z_c$ represents H or $(C_1-C_4)$-alkyl;

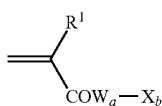

(IIIb)

where
$R^1$ represents hydrogen or methyl,
$X_b$ represents an aromatic or araliphatic radical having 3 to 30 carbon atoms which optionally contains one or more, e.g., 1, 2, or 3, of the heteroatoms N, O und S,
$W_a$ represents oxygen or an NH group.

Useful monomers (C) include for example the following esters and amides of acrylic acid and methacrylic acid: phenyl, benzyl, tolyl, 2-phenoxyethyl, phenethyl. Further monomers (C) are vinylaromatic monomers such as styrene and its derivatives, such as vinyltoluene and alpha-methylstyrene for example. The aromatic unit may also comprise heteroaromatics, as in 1-vinylimidazole for example.

Particularly preferred monomers (C) can be: styrene, 1-vinylimidazole, benzyl methacrylate, 2-phenoxyethyl methacrylate and phenethyl methacrylate.

Preferred monomers (D) can be described by formula (IV):

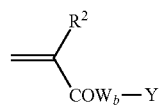

(IV)

where
$R^2$ represents hydrogen or methyl,
Y represents an aliphatic hydrocarbyl radical having 1 to 30 carbon atoms, preferably 6 to 30, particularly 9 to 20 carbon atoms, which may be linear or branched or else cyclic, and which may contain heteroatoms O, N and/or S and may also be unsaturated,
$W_b$ represents oxygen or an NH group.

Monomers (D) include for example the following esters and amides of acrylic acid and methacrylic acid: methyl, ethyl, propyl, isopropyl, n-butyl, isobutyl, t-butyl, pentyl, hexyl, 2-ethylhexyl, 3,3-dimethylbutyl, heptyl, octyl, isooctyl, nonyl, lauryl, cetyl, stearyl, behenyl, cyclohexyl, trimethylcyclohexyl, t-butylcyclohexyl, bornyl, isobornyl, adamantyl, (2,2-dimethyl-1-methyl)propyl, cyclopentyl, 4-ethylcyclohexyl, 2-ethoxyethyl, tetrahydrofurfuryl and tetrahydropyranyl.

Preferred monomers (D) are the following alkyl esters and alkylamides of acrylic acid and methacrylic acid: methyl, ethyl, propyl, butyl, isobutyl, 2-ethoxyethyl, myristyl, octadecyl, more preferably 2-ethylhexyl and lauryl.

The copolymers of the present invention have a molecular weight of $10^3$ g/mol to $10^9$ g/mol, more preferably of $10^3$ to $10^7$ g/mol and even more preferably of $10^3$ to $10^5$ g/mol.

The copolymers of the present invention can be produced by means of free-radical polymerization. The polymerization reaction can be carried out as a continuous operation, as a batch operation or as a semi-continuous operation.

The polymerization reaction is advantageously conducted as a precipitation polymerization, an emulsion polymerization, a solution polymerization, a bulk polymerization or a gel polymerization. A solution polymerization is particularly advantageous for the performance profile of the copolymers of the present invention.

Useful solvents for the polymerization reaction include all organic or inorganic solvents which are very substantially inert with regard to free-radical polymerization reactions, examples being ethyl acetate, n-butyl acetate or 1-methoxy-2-propyl acetate, and also alcohols such as, for example, ethanol, i-propanol, n-butanol, 2-ethylhexanol or 1-methoxy-2-propanol, and also diols such as ethylene glycol and propylene glycol. It is similarly possible to use ketones such as acetone, butanone, pentanone, hexanone and methyl ethyl ketone, alkyl esters of acetic, propionic and butyric acids such as for example ethyl acetate, butyl acetate and amyl acetate, ethers such as tetrahydrofuran, diethyl ethers, and monoalkyl and dialkyl ethers of ethylene glycol and of polyethylene glycol. It is similarly possible to use aromatic solvents such as, for example, toluene, xylene or higher-boiling alkylbenzenes. The use of solvent mixtures is likewise conceivable, in which case the choice of solvent or solvents depends on the planned use of the copolymer of the present invention. Preference is given to using water; lower alcohols; preferably methanol, ethanol, propanols, iso-, sec- and t-butanols, 2-ethylhexanol, butyl glycol and butyl diglycol, more preferably isopropanol, t-butanol, 2-ethylhexanol, butyl glycol and butyl diglycol; hydrocarbons having 5 to 30 carbon atoms and mixtures and emulsions thereof.

The polymerization reaction is preferably carried out in the temperature range between 0 and 180° C., more preferably between 10 and 100° C., not only at 1.0 atmospheric pressure but also under elevated or reduced pressure. If appropriate, the polymerization can also be carried out under a protective gas atmosphere, preferably under nitrogen.

The polymerization can be induced using high-energy, electromagnetic rays, mechanical energy or the customary, chemical polymerization initiators such as organic peroxides, for example benzoyl peroxide, tert-butyl hydroperoxide, methyl ethyl ketone peroxide, cumoyl peroxide, dilauroyl peroxide (DLP) or azo initiators, for example azoisobutyronitrile (AIBN), azobisamidopropyl hydrochloride (ABAH) and 2,2'-azobis(2-methylbutyronitrile) (AMBN). Similarly useful are inorganic peroxy compounds, for example $(NH_4)_2S_2O_8$, $K_2S_2O_8$ or $H_2O_2$, if appropriate in combination with reducing agents (for example sodium hydrogensulfite, ascorbic acid, iron(II) sulfate) or redox systems which contain an aliphatic or aromatic sulfonic acid (for example benzenesulfonic acid, toluenesulfonic acid) as reducing component.

The customary molecular weight regulators are used. Suitable known regulators include for example alcohols, such as methanol, ethanol, propanol, isopropanol, n-butanol, sec-butanol and amyl alcohols, aldehydes, ketones, alkylthiols, for example dodecylthiol and tert-dodecylthiol, thioglycolic acid, isooctyl thioglycolate and some halogen compounds, for example carbon tetrachloride, chloroform and methylene chloride.

Following the polymerization, the solvent is removed.

The nonionic polymer thus obtained now possesses, on the polyoxyalkylene side chains, reactive hydroxyl functions which are next converted to anionic functionalities. Examples of anionic functionalities are $SO_3M$, $CH_2COOM$, $PO_3M_2$ or sulfosuccinate. M therein has the hereinbelow defined meaning.

The anionic copolymers of the present invention can be described for example by the formulae (V) or (VI):

(V)

(VI)

The indices a, b, c and d indicate the molar fraction of the respective monomer (A), (B), (C) and (D), viz.:
a=0.001-0.9; b=0.001-0.9; c=0.001-0.9; d=0.001-0.9;
preferably a=0.001-0.7; b=0.01-0.8; c=0.001-0.5; d=0.001-0.5;
subject to the proviso that the sum total of a+b+c+d is equal to 1.

The remaining variables are as defined in formula (I), (II), (IIIa) and (IIIb).

In formulae (V) and (VI), Q represents $SO_3$, $CH_2COO$, $PO_3M$, or QM is

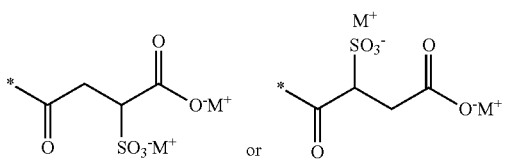

and M represents H, a metal cation, or an ammonium, e.g. Na, K, Ca, $NH_4^+$, an alkylated ammonium ion, or a combination thereof (the asterisk * in the Markush formula indicates that there is a link to the polymer at this site).

In the case of the sulfosuccinates, the nonionic copolymers are for example initially esterified with maleic anhydride. Here the esterification can be carried out without solvent in that the reaction can be carried out in the polymer melt under elevated temperature. Subsequently, the maleic monoester obtained is sulfonated. To this end, it is reacted for example with sodium sulfite or sodium pyrosulfite in an aqueous solution. The product obtained is the aqueous solution of the sulfosuccinate sodium salt.

The sulfate esters are prepared for example by reacting the nonionic copolymers with sulfamic acid. This reaction takes place in a melt of the nonionic copolymer in the presence of sulfamic acid. The OH groups of the copolymer are converted into sulfate esters, which are then present as ammonium salt.

The terminal hydroxyl functions can be converted into the corresponding polyether carboxylates by carboxymethylation, for example with sodium chloroacetate.

The phosphoric esters are obtainable for example by reacting a melt of the nonionic copolymer with polyphosphoric acid or phosphorus pentoxide. This reaction may yield not only phosphoric monoesters but also phosphoric diesters and triesters.

Since the conversion of the nonionic polymer to anionic functionalities is usually not quantitative, the product is usually a mixture of converted polymer (QM=$SO_3M$, $CH_2COOM$, $PO_3M_2$, sulfosuccinate) and unconverted polymer (QM=H). This mixture is practically impossible to resolve, and can be used as such for the purposes of the present invention.

The present invention further provides for the use of the anionic copolymer of the present invention as a dispersant particularly for pigments and fillers, for example in the preparation of waterborne or solventborne pigment concentrates which are used for coloration of dispersion and varnish colors, paints, coatings and printing inks, and also for coloration or printing of paper, cardboard and textiles.

Synthesis Prescription 1:
General Prescription for Polymerization:

A flask equipped with stirrer, reflux condenser, internal thermometer and nitrogen inlet is initially charged with monomer A, monomer B, monomer C, monomer D and the molecular weight regulator in solvent while nitrogen is introduced, in the parts by weight indicated in the tables which follow. Then, the temperature is raised to 80° C. with stirring and a solution of the initiator is added during one hour by metering. The batch is subsequently further stirred at this temperature for 2 hours, and then the solvent is removed under reduced pressure.

Synthesis Prescription 2:
General Synthesis Prescription for Converting the Polymers Obtained According to Synthesis Prescription 1 to Anionic Copolymers Having Ether Sulfate Groups on the Side Chains:

The copolymer is initially charged in a flask under nitrogen together with sulfamic acid and urea. The initial charge is then heated to 100° C. for 4 hours with stirring. Then, the pH is adjusted to 6.5-7.5 with 50% aqueous sodium hydroxide solution. NMR spectroscopy can be used to verify a degree of conversion of >95% to the corresponding sulfuric ester ammonium salt.

Synthesis Prescription 3:
General Synthesis Prescription for Converting the Polymers Obtained According to Synthesis Prescription 1 to Anionic Copolymers Having Sulfosuccinate Groups on the Side Chains:

The copolymer is initially charged to a flask under nitrogen. Then, maleic anhydride and sodium hydroxide are added and the batch is heated with stirring to a temperature of 75-85° C. At this temperature, the batch is stirred for three hours and then admixed with aqueous sodium sulfite solution (10% strength by weight) by metered addition. At 60 to 70° C., the batch is stirred to complete the reaction and subsequently adjusted to pH 7 with 50% by weight aqueous sodium hydroxide solution.

The two tables which follow contain two-stage synthesis examples in which the polymer is initially prepared according to synthesis prescription 1 and then the anionic derivative of the polymer is prepared according to synthesis prescription 2 or 3.

| | Example No. | 1 | 2 | 3 | 4 | 5 | 6 | 7 | 8 | 9 | 10 |
|---|---|---|---|---|---|---|---|---|---|---|---|
| Monomer A | polyglycol 1 | | | | | | 143.8 | | | 243.2 | 15.9 |
| | polyglycol 2 | 137.3 | | | 106.9 | | | | | | |
| | polyglycol 3 | | | 93.0 | | | | 242.5 | | | |
| | polyglycol 4 | | 0.4 | | | 154.0 | | | 339.1 | | |
| Monomer B | polyglycol 6 | 183.1 | 277.8 | 186.0 | 285.0 | 231.0 | 102.7 | 121.3 | 56.5 | 69.5 | 227.3 |
| Monomer C | 1-vinylimidazole | | 13.1 | | | | | | 0.4 | | |
| | styrene | 19.0 | | | | 8.0 | | | | | |
| | benzyl methacrylate | | | 0.4 | | | 72.3 | | | | |
| | phenethyl methacrylate | | | | 0.4 | | | | | 66.0 | |
| | 2-phenoxyethyl methacrylate | | | | | | | | 0.4 | | 93.6 |
| Monomer D | 2-ethylhexyl methacrylate | | | 110.5 | | | | | | | |
| | lauryl methacrylate | 46.5 | | | | | 52.2 | | | | |
| | stearyl methacrylate | | 94.2 | | 0.4 | | | | 0.4 | | |
| | isobornyl methacrylate | | | | | 0.4 | | 26.9 | | | |
| | vinyl neodecanoate | | | | | | | | | 0.4 | 45.0 |
| Initiator | AMBN | 7.0 | | 8.0 | 4.1 | | | 4.7 | 2.2 | 10.7 | 9.2 |
| | dibenzoyl peroxide | | 8.4 | | | 5.6 | 16.2 | | | | |
| Regulator | dodecanethiol | 7.0 | 6.6 | | 4.1 | | 12.6 | 4.6 | 2.1 | 10.6 | 9.1 |
| | ethyl mercaptan | | | 2.4 | | 1.3 | | | | | |
| Solvent | methyl ethyl ketone | | | | | 600 | | | 600 | | |
| | methyl isobutyl ketone | | 600 | | | | | | | 600 | 600 |
| | isopropanol | 600 | | 600 | 600 | | 600 | 600 | | | |
| | $M_w$ of polymer obtained | 9800 | 14200 | 13500 | 17100 | 20500 | 16000 | 18900 | 17700 | 11300 | 19000 |
| | derivatization of polymer to synthesis prescription | 2 | 3 | 2 | 2 | 3 | 3 | 2 | 3 | 2 | 2 |
| | sulfamic acid | 17.4 | | 6.4 | 6.8 | | | 23.1 | | 33.1 | 4.3 |
| | urea | 0.3 | | 0.1 | 0.1 | | | 0.4 | | 0.6 | 0.1 |
| | maleic anhydride | | 15.0 | | | 8.3 | 22.1 | | 18.3 | | |
| | NaOH | | 0.9 | | | 0.5 | 1.32 | | 1.09 | | |
| | sodium sulfite solution (10% in water) | | 19.2 | | | 10.7 | 28.5 | | 23.5 | | |

| | Example No. | 11 | 12 | 13 | 14 | 15 | 16 | 17 | 18 | 19 | 20 |
|---|---|---|---|---|---|---|---|---|---|---|---|
| Monomer A | polyglycol 1 | | | | | | 155.4 | | | 212.7 | 57.3 |
| | polyglycol 2 | 195.5 | | | 199.0 | | | | | | |
| | polyglycol 3 | | | 66.9 | | | | 324.7 | | | |
| | polyglycol 4 | | 0.4 | | | 246.6 | | | 373.4 | | |
| Monomer B | polyglycol 5 | 91.2 | 177.2 | 117.0 | 185.8 | 129.5 | 77.7 | 28.4 | 21.8 | 106.3 | 114.7 |
| Monomer C | 1-vinylimidazole | | 23.8 | | | | | | | | |
| | styrene | 27.1 | | 0.4 | | 12.8 | | | | | |
| | benzyl methacrylate | | | | | | 78.2 | | | | |
| | phenethyl methacrylate | | | | | | | 0.4 | | 57.7 | |
| | 2-phenoxyethyl methacrylate | | | | 0.4 | | | | 0.4 | | 135.0 |
| Monomer D | 2-ethylhexyl methacrylate | | | 198.6 | | | | | | | |
| | lauryl methacrylate | 66.2 | | | | | | 56.4 | | 0.4 | |
| | stearyl methacrylate | | 171.6 | | | 0.4 | | | | | |
| | isobornyl methacrylate | | | | 0.4 | | | 36.0 | | | |
| | vinyl neodecanoate | | | | | | | | 0.4 | | 64.9 |
| Initiator | AMBN | 10.0 | | 13.5 | 7.6 | | | 5.5 | 2.4 | 11.7 | 14.2 |
| | dibenzoyl peroxide | | 15.3 | | | 9.0 | 17.5 | | | | |
| Regulator | dodecanethiol | 9.9 | 12.0 | | 7.6 | | 14.8 | 5.4 | 2.4 | 11.5 | 14.0 |
| | ethyl mercaptan | | | 4.1 | | 2.2 | | | | | |

-continued

| Solvent | | 1 | 2 | 3 | 4 | 5 | 6 | 7 | 8 | 9 | 10 |
|---|---|---|---|---|---|---|---|---|---|---|---|
| | methyl ethyl ketone | | | | | 600 | | | 600 | | |
| | methyl isobutyl ketone | | 600 | | | | | | | 600 | 600 |
| | isopropanol | 600 | | 600 | 600 | | 600 | 600 | | | |
| | $M_w$ of polymer obtained | 7100 | 8200 | 14900 | 9500 | 17100 | 12600 | 22800 | 16000 | 9300 | 8400 |
| | derivatization of polymer to synthesis prescription | 2 | 2 | 3 | 2 | 3 | 2 | 3 | 2 | 2 | 3 |
| | sulfamic acid | 12.4 | 24.1 | | 25.3 | | 21.2 | — | 17.8 | 28.9 | |
| | urea | 0.2 | 0.4 | | 0.4 | | 0.4 | | 0.3 | 0.5 | |
| | maleic anhydride | | | 3.6 | | 13.3 | | 17.5 | | | 8.8 |
| | NaOH | | | 0.2 | | 0.8 | | 1.0 | | | 0.5 |
| | sodium sulfite solution (10% in water) | | | 4.6 | | 17.1 | | 22.5 | | | 11.3 |

Composition of Monomer A:

Polyglycol 1 polyalkylene glycol monomethacrylic ester (formula (I), m=n=3-4; (A-O) corresponds to [CH$_2$CH(CH$_3$)O)], (B—O) corresponds to (CH$_2$CH$_2$O)), molar mass about 350 g/mol Polyglycol 2 polyalkylene glycol monomethacrylic ester (formula (I), m=2, n=12-13; (A-O) corresponds to (CH$_2$CH(CH$_3$)O)), (B—O) corresponds to (CH$_2$CH$_2$O)), molar mass about 750 g/mol Polyglycol 3 polyalkylene glycol monomethacrylic ester (formula (I), m=2, n=17-19; (A-O) corresponds to (CH$_2$CH(CH$_3$)O)), (B—O) corresponds to (CH$_2$CH$_2$O)), molar mass about 1000 g/mol Polyglycol 4 polyalkylene glycol monomethacrylic ester (formula (I), m=2, n=40-42; (A-O) corresponds to (CH$_2$CH(CH$_3$)O)), (B—O) corresponds to (CH$_2$CH$_2$O)), molar mass about 2000 g/mol Composition of Monomer B:

Polyglycol 5 polypropylene glycol monomethacrylic ester (formula (II), o=4-5; (0-0) corresponds to [CH$_2$CH(CH$_3$)O)], molar mass about 350 g/mol Polyglycol 6 polypropylene glycol monomethacrylic ester (formula (II), o=15-16; (D-0) corresponds to [CH$_2$CH(CH$_3$)O)], molar mass about 1000 g/mol AMBN=2,2'-azobis(2-methylbutyronitrile)

USE EXAMPLE

Production of a Pigment Formulation

The pigment, in the form alternatively of powder, granulate or presscake, was pasted up in deionized water together with the dispersants and the other adjuvants and then homogenized and predispersed using a dissolver (for example from VMA-Getzmann GmbH, type AE3-M1) or some other suitable apparatus. Fine dispersion was subsequently effected using a bead mill (for example AE3-M1 from VMA-Getzmann) or else some other suitable dispersing assembly, with milling being carried out with siliquartzite beads or zirconium mixed oxide beads of size d=1 mm, accompanied by cooling, until the desired color strength and coloristics were obtained. Thereafter, grinding media were separated off, the pigment formulation was isolated and standardized with deionized water to a concentration of about 20% and dried by means of a spray dryer from Büchi (Büchi 190). A dry powder was obtained.

Evaluation of a Pigment Formulation

Color strength and hue were determined in accordance with DIN 55986. The aqueous pigment dispersion and the dry powder were tested (color strength and compatibilities with the medium to be colored) in a conventional waterborne emulsion paint for interiors and in a conventional solventborne lacquer. The rub-out test was carried out by applying the paint, after mixing with the pigment dispersion, to a paint card. Subsequently, the applied coating was rubbed with the finger on the lower part of the paint card. Incompatibility was present when the rubbed area is then more strongly colored than the adjacent area not aftertreated (the rub-out test is described in DE 2 638 946).

Viscosity was determined using a cone-and-plate viscometer (Roto Visco 1) from Haake at 20° C. (titanium cone: Ø60 mm, 1°), the relationship between viscosity and shear rate in a range between 0 and 200 s$^{-1}$ being investigated. Viscosities were measured at a shear rate of 60 s$^{-1}$.

To evaluate the storage stability of the dispersions, viscosity was measured directly after production of the formulation and also after four weeks' storage at 50° C.

The pigment formulation described in the example which follows was produced by the method described above, the following constituents being used in the stated amounts such that 100 parts of the pigment formulation are formed. Parts are by weight in the example which follows:

35 parts of C.I. Pigment Black 7
14 parts of polymer from synthesis example 19 (table)
1 part of wetter
50 parts of water After drying, the pigment formulation had the following composition, neglecting a residual water content of about 1%:

70 parts of C.I. Pigment Black 7
28 parts of polymer from synthesis example 19 (table)
2 parts of wetter The pigment formulation has a high color strength in the white dispersion and in the lacquer and is stable. The rub-out test shows no color strength differences compared with the rubbed area. The dispersion proves to be readily flowable and storage stable since it is still readily flowable after 28 days' storage at 50° C. The dry powder is spontaneously dispersible in the waterborne white emulsion and in the solventborne lacquer. Manual stirring is done for 3 minutes. Both color systems give a high color strength and also a nonflocculating application free of specks. The rub-out test does not show any color strength differences compared to the after-rubbed area.

What is claimed is:

1. An anionically modified copolymer obtained by polymerization of monomers (A), (B), (C) and (D) to obtain nonionic copolymers having reactive terminal OH groups, and subsequent conversion of the terminal OH groups to anionic end groups, wherein (A) is a monomer of formula (I)

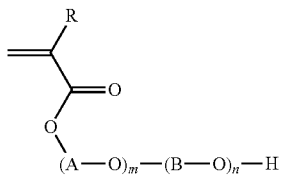

wherein
A is $C_2$-$C_4$-alkylene,
B is a $C_2$-$C_4$-alkylene other than A,
R is hydrogen or methyl,
m is from 1 to 500;
n is from 1 to 500,
and the sum total of m+n is from 2 to 1000;

(B) is a monomer of formula (II)

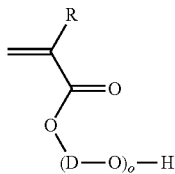

where
D is $C_3$-alkylene,
R is hydrogen or methyl,
o is from 2 to 500;

(C) is an ethylenically unsaturated monomer containing an aromatic group; and (D) is an ethylenically unsaturated monomer containing an alkyl radical, wherein the copolymer is of the formulae (V) or (VI)

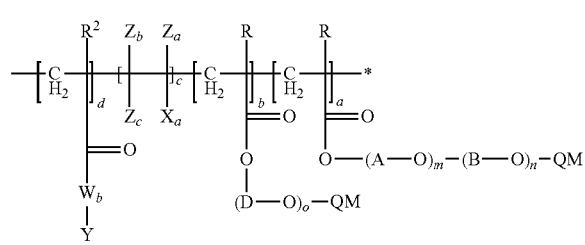

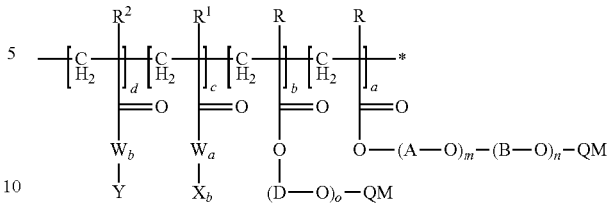

wherein
A is $C_2$-$C_4$-alkylene,
B is a $C_2$-$C_4$-alkylene other than A,
D is a $C_3$-alkylene,
m is from 1 to 500;
n is from 1 to 500;
and the sum total of m+n is from 2 to 1000;
o is from 2 to 500;
$X_a$ is an aromatic or araliphatic radical having 3 to 30 carbon atoms optionally containing heteroatoms selected from the group consisting of N, O and S,
$Z_a$ is H or $(C_1$-$C_4)$-alkyl,
$Z_b$ is H or $(C_1$-$C_4)$-alkyl,
$Z_c$ is H or $(C_1$-$C_4)$-alkyl;
R is hydrogen or methyl,
$R^1$ is hydrogen or methyl,
$R^2$ is hydrogen or methyl,
Y is an aliphatic hydrocarbon radical having 1 to 30 carbon atoms, optionally linear or branched or cyclic, and optionally contains heteroatoms selected from the group consisting of O, N and S and is optionally unsaturated,
$W_b$ is oxygen or an NH group;
$X_b$ is an aromatic or araliphatic radical having 3 to 30 carbon atoms optionally containing heteroatoms selected from the group consisting of O, N and S,
$W_a$ is oxygen or an NH group,
Q is $SO_3$, $CH_2COO$, $PO_3M$ or sulfosuccinate, and
M is H, a metal cation, an ammonium, an alkylated ammonium ion, or a combination thereof;
a=0.001-0.9
b=0.001-0.9
c=0.001-0.9
d=0.001-0.9
subject to the proviso that the sum total of a+b+c+d is equal to 1.

2. The copolymer as claimed in claim 1, wherein the molar fraction of monomer (A) is 0.1 to 90%, of monomer (B) is 0.1 to 90%, of monomer (C) is 0.1 to 90% and of monomer (D) is 0.1 to 90%, the molar fractions summing to 100%.

3. The copolymer as claimed in claim 1, wherein A is ethylene and B is propylene, or A is propylene and B is ethylene.

4. The copolymer as claimed in claim 1, wherein the alkylene oxide units $A\text{-}O)_m$ and $(B\text{—}O)_n$ are in blocks.

5. The copolymer as claimed in claim 1, wherein the monomer (C) is a compound of formula (IIIa) or (IIIb)

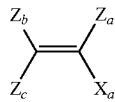 (IIIa)

wherein
$X_a$ is an aromatic or araliphatic radical having 3 to 30 carbon atoms optionally containing heteroatoms selected from the group consisting of N, O and S,
$Z_a$ is H or ($C_1$-$C_4$)-alkyl,
$Z_b$ is H or ($C_1$-$C_4$)-alkyl, and
$Z_c$ is H or ($C_1$-$C_4$)-alkyl,

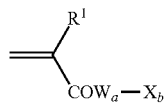 (IIIb)

wherein
$R^1$ is hydrogen or methyl,
$X_b$ is an aromatic or araliphatic radical having 3 to 30 carbon atoms optionally containing heteroatoms selected from the group consisting of N, O and S,
$W_a$ is oxygen or an NH group.

6. The copolymer as claimed in claim 1, wherein the monomer (D) is a compound of formula (IV):

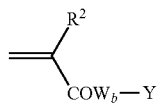 (IV)

wherein
$R^2$ is hydrogen or methyl,
Y is an aliphatic hydrocarbyl radical having 1 to 30 carbon atoms, optionally linear or branched or cyclic, and optionally contains heteroatoms selected from the group consisting of O, N and S and is optionally unsaturated,
$W_b$ is oxygen or an NH group.

7. The copolymer as claimed in claim 1, wherein the anionic end groups are selected from the group consisting of $SO_3M$, $CH_2COOM$, $PO_3M_2$ and sulfosuccinate, wherein M represents H, a metal cation, $NH_4^+$, an alkylated ammonium ion or a combination thereof.

8. A process for producing a copolymer as claimed in claim 1, comprising the steps of free-radically polymerizing the monomers (A), (B), (C) and (D) and converting the resulting terminal OH groups to anionic end groups.

9. A dispersant comprising a copolymer as claimed in claim 1.

10. The dispersant as claimed in claim 9, wherein the dispersant is a pigment dispersant or a filler dispersant.

\* \* \* \* \*